United States Patent
Bunha et al.

(10) Patent No.: US 11,935,708 B2
(45) Date of Patent: Mar. 19, 2024

(54) SOLID ELECTROLYTIC CAPACITOR WITH IMPROVED RELIABILITY

(71) Applicant: KEMET Electronics Corporation, Fort Lauderdale, FL (US)

(72) Inventors: Ajaykumar Bunha, Simpsonville, SC (US); Antony P. Chacko, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 69 days.

(21) Appl. No.: 17/831,138

(22) Filed: Jun. 2, 2022

(65) Prior Publication Data
US 2022/0293349 A1    Sep. 15, 2022

Related U.S. Application Data

(63) Continuation-in-part of application No. 17/178,631, filed on Feb. 18, 2021, now Pat. No. 11,694,851.

(51) Int. Cl.
  *H01G 9/15*  (2006.01)
  *H01G 9/028* (2006.01)
  *H01G 9/07*  (2006.01)

(52) U.S. Cl.
  CPC ............ *H01G 9/15* (2013.01); *H01G 9/028* (2013.01); *H01G 9/07* (2013.01)

(58) Field of Classification Search
  None
  See application file for complete search history.

(56) References Cited

U.S. PATENT DOCUMENTS

| | | |
|---|---|---|
| 4,858,078 A | 8/1989 | Morimoto et al. |
| 7,106,575 B2 | 9/2006 | Taketani et al. |
| (Continued) | | |

*Primary Examiner* — David M Sinclair
(74) *Attorney, Agent, or Firm* — Joseph T. Guy; Patent Filing Specialist Inc.

(57) ABSTRACT

The present invention if related to an improved electrolytic capacitor and a method of making the improved electrolytic capacitor. The electrolytic capacitor comprises an anode comprising a dielectric layer on the anode. A first mordant layer is on the dielectric wherein the first mordant layer comprises a mordant compound of Formula A:

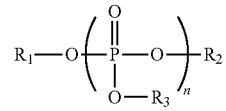

Formula A wherein:
$R_1$ and $R_2$ is independently selected from H; cation, linear alkyl, cyclic alkyl or substituted alkyl of 1 to 10 carbons;
$R_3$ is selected from $-CR_4R_5R_6$ wherein $R_4$ represents a hydrogen, an alkyl of 1-20 carbons or an aryl of 6-20 carbons; $R_4$ and $R_5$ can be taken together to represent a cyclic alkyl or substituted cyclic alkyl or $(-CR_6OP(O)OR_1OR_2)_n$;
$R_5$ represents an alkyl of 1-20 carbons or an aryl of 6-20 carbons; $R_4$ and $R_5$ can be taken together to represent a cyclic alkyl or substituted cyclic alkyl or $(-CR_6OP(O)OR_1OR_2)_n$;
$R_6$ represents a hydrogen, an alkyl of 1-20 carbons or an aryl of 6-20 carbons; and
n is an integer from 1 to 20; and
a crosslinker. A primary conductive polymer layer is on the first mordant layer.

88 Claims, 3 Drawing Sheets

(56) References Cited

U.S. PATENT DOCUMENTS

| | | |
|---|---|---|
| 10,340,091 B2 | 7/2019 | Bunha et al. |
| 2006/0044736 A1 | 3/2006 | Taketani |
| 2010/0053847 A1* | 3/2010 | Tani .................. H01G 9/10 |
| | | 361/505 |
| 2010/0079928 A1 | 4/2010 | Harada |
| 2015/0029642 A1 | 1/2015 | Shi |
| 2016/0300665 A1 | 10/2016 | Ning |
| 2016/0351339 A1 | 12/2016 | Uher |
| 2018/0330888 A1 | 11/2018 | Shi |

\* cited by examiner

SOLID ELECTROLYTIC CAPACITOR WITH IMPROVED RELIABILITY

CROSS-REFERENCE TO RELATED APPLICATIONS

The present invention is a continuation-in-part of pending U.S. patent application Ser. No. 17/178,631 filed Feb. 18, 2021 which is incorporated herein by reference.

BACKGROUND

The present invention is related to an improved method of preparing a solid electrolyte capacitor and an improved capacitor formed thereby. More specifically, the present invention is related to improving reliability and reducing the Anomalous Charging Current (ACC) of a capacitor by incorporating a mordant layer between the dielectric and the conductive polymer layer and between adjacent conductive polymer layers.

Solid electrolyte capacitors have emerged as a major tool in the development of electronic components. Solid electrolytic capacitors, particularly those utilizing valve metal anodes, originally emerged comprising a pressed powder anode with a dielectric on the anode and manganese dioxide as the conductive layer on the dielectric wherein the manganese dioxide functioned as the cathode. The manganese dioxide was replaced by capacitors comprising conductive polymer as the cathode layer due, in part, to their non-burning failure mode. Of these solid electrolytic capacitors comprising polythiophene based conductive polymers have proven to be the most desirable.

However, when the solid electrolytic capacitors comprising polythiophene based conductive polymers are subjected to thorough drying, they exhibit anomalous charge current (ACC) exceeding the theoretical charge current (I (t)), which is calculated as follows: I(t)=C*dv/dt
where C is the capacitance and dV/dt is the voltage ramp. The anomalous charge current (ACC) has the potential to disturb intended circuit function. More details on Anomalous charge current in solid electrolytic capacitors described elsewhere. (Freeman et al, J. Solid State Sci. Technol. 2013, 2, N197-N204, Freeman et al, Appl. Sci. 2021, 11, 5514, and Chacko et al, 9,793,058).

Provided herein is a novel mordanted layer, between the dielectric and conductive polymer layer and between adjacent conductive polymer layers significantly reduces Anomalous charge current (ACC) in solid electrolytic capacitors.

SUMMARY OF THE INVENTION

The present invention is directed to an improved capacitor comprising a mordant layer.

A particular feature of the invention is a mordant layer which reduces the Anomalous Charging Current (ACC) of a capacitor.

Another feature of the invention is the improved reliability of the capacitor with the mordant layer in high temperature and high humidity conditions.

The electrolytic capacitor comprises an anode comprising a dielectric layer on the anode. A mordant layer is between the dielectric and conductive polymer layer and optionally between or within adjacent conductive polymer layers wherein the mordant layer comprises a mixture or reactive product of represented by the mordant compound of Formula A and crosslinker.

An exemplary mordant compound is defined by Formula A:

wherein:
$R_1$ and $R_2$ is independently selected from H; cation, linear alkyl, cyclic alkyl or substituted alkyl of 1 to 10 carbons;
$R_3$ is selected from —$CR_4R_5R_6$ wherein $R_4$ represents a hydrogen, an alkyl of 1-20 carbons or an aryl of 6-20 carbons; $R_4$ and $R_5$ can be taken together to represent a cyclic alkyl or substituted cyclic alkyl or (—$CR_6OP(O)OR_1OR_2)_n$;
$R_5$ represents an alkyl of 1-20 carbons or an aryl of 6-20 carbons; $R_4$ and $R_5$ can be taken together to represent a cyclic alkyl or substituted cyclic alkyl or (—$CR_6OP(O)OR_1OR_2)_n$;
$R_6$ represents a hydrogen, an alkyl of 1-20 carbons or an aryl of 6-20 carbons; and
n is an integer from 1 to 20.

These and other advantages, as will be realized, are provided by an electrolytic capacitor. The electrolytic capacitor comprises an anode comprising a dielectric layer on the anode. A first mordant layer is on the dielectric wherein the first mordant layer comprises a mordant compound of Formula A:

Formula A wherein:
$R_1$ and $R_2$ is independently selected from H; cation, linear alkyl, cyclic alkyl or substituted alkyl of 1 to 10 carbons;
$R_3$ is selected from —$CR_4R_5R_6$ wherein $R_4$ represents a hydrogen, an alkyl of 1-20 carbons or an aryl of 6-20 carbons; $R_4$ and $R_5$ can be taken together to represent a cyclic alkyl or substituted cyclic alkyl or (—$CR_6OP(O)OR_1OR_2)_n$;
$R_5$ represents an alkyl of 1-20 carbons or an aryl of 6-20 carbons; $R_4$ and $R_5$ can be taken together to represent a cyclic alkyl or substituted cyclic alkyl or (—$CR_6OP(O)OR_1OR_2)_n$;
$R_6$ represents a hydrogen, an alkyl of 1-20 carbons or an aryl of 6-20 carbons; and
n is an integer from 1 to 20; and
a crosslinker. A primary conductive polymer layer is on the first mordant layer.

Yet another embodiment is provided in a method of forming an electrolytic capacitor comprising:
forming an anode;
forming a dielectric on the anode;
forming a first mordant layer on the dielectric wherein the first mordant layer comprises a mordant compound of Formula A:

Formula A wherein:
$R_1$ and $R_2$ is independently selected from H; cation, linear alkyl, cyclic alkyl or substituted alkyl of 1 to 10 carbons;
$R_3$ is selected from —$CR_4R_5R_6$ wherein $R_4$ represents a hydrogen, an alkyl of 1-20 carbons or an aryl of 6-20 carbons; $R_4$ and $R_5$ can be taken together to represent a cyclic alkyl or substituted cyclic alkyl or (—$CR_6OP(O)OR_1OR_2)_n$;
$R_5$ represents an alkyl of 1-20 carbons or an aryl of 6-20 carbons; $R_4$ and $R_5$ can be taken together to represent a cyclic alkyl or substituted cyclic alkyl or (—$CR_6OP(O)OR_1OR_2)_n$;
$R_6$ represents a hydrogen, an alkyl of 1-20 carbons or an aryl of 6-20 carbons; and
n is an integer from 1 to 20; and
a crosslinker; and
a primary conductive polymer layer on said first mordant layer.

DESCRIPTION

The present invention is related to an improved electrolytic capacitor which exhibits significantly lower Anomalous Charging Current (ACC). More specifically, the present invention is related to an electrolytic capacitor comprising a mordant between the dielectric and conductive polymer layer and optionally between or within adjacently conductive polymer layers wherein the mordant layer significantly reduces Anomalous Charging Current (ACC) of capacitor.

The invention will be described with reference to the figures which are an integral, but non-limiting, part of the specification provided for clarity of the invention.

Figure 1:
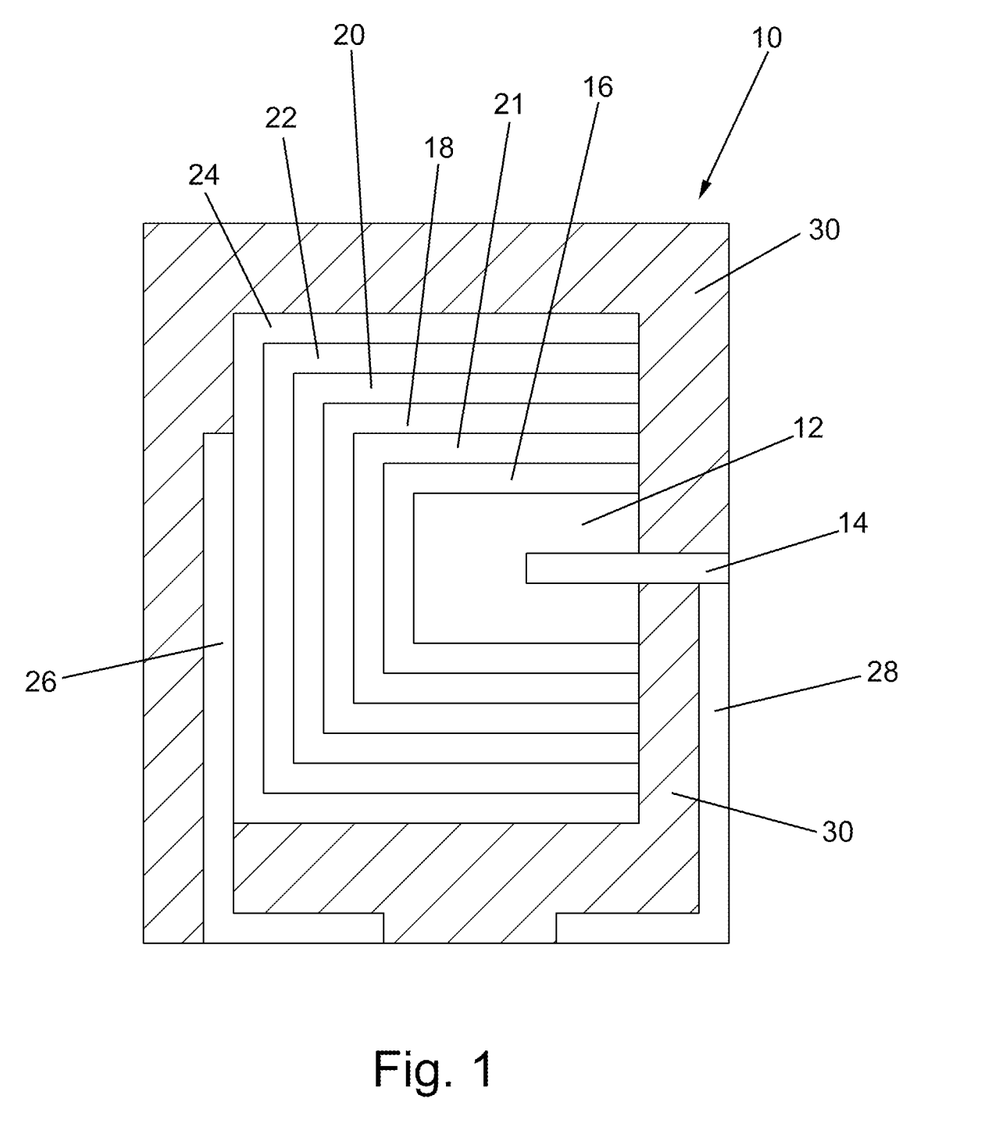
FIG. 1 is a schematic cross-sectional view of an embodiment of the invention.

An embodiment of the invention will be described with reference to FIG. 1. In FIG. 1, an inventive capacitor, 10, is illustrated schematically in cross-sectional view. The capacitor comprises an anode, 12, which is preferable a porous monolith formed by pressing a powder. An anode wire, 14, extends from the anode. The anode wire can be embedded in the powder prior to pressing, which is preferred, or the anode wire can be attached to the surface of the anode after pressing such as by welding. A dielectric, 16, is formed on the surface of the anode. While illustrated as a layer of consistent thickness the actual dielectric layer is on the interstitial surfaces of the porous monolith. A first mordant layer, 21, overlies the dielectric and is between the dielectric and primary conductive polymer layer, 18, wherein the primary conductive polymer layer, 18, is on the mordant layer and preferably extends into the interstitial surfaces of the monolith to increase the surface area of conductive polymer coating on the dielectric. While illustrated as a single layer, for the purposes of discussion, the primary conductive polymer layer is typically applied from multiple applications. A second mordant layer, 20, is optionally formed on or in the primary conductive layer wherein the mordant layer comprises a mordant compound of Formula A, described herein below, and a crosslinker. A secondary conductive polymer layer, 22, is formed on the mordant layer or on the primary conductive polymer layer. An adhesion layer, 24, is optionally but preferably formed on the secondary conductive polymer layer. The adhesion layer allows electrical attachment of a cathode lead, 26, to the secondary conductive polymer layer such as by soldering or by a conductive adhesive. It is known in the art that attachment of a lead to a conductive polymer layer is difficult and an adhesion layer is typically used to allow good physical and electrical contact between the secondary conductive polymer layer and cathode lead. An anode lead, 28, is in electrical contact with the anode wire. An optional but preferred electrically insulating resin, 30, encases all but the bottom portion of the cathode lead and anode lead.

Figure 3:
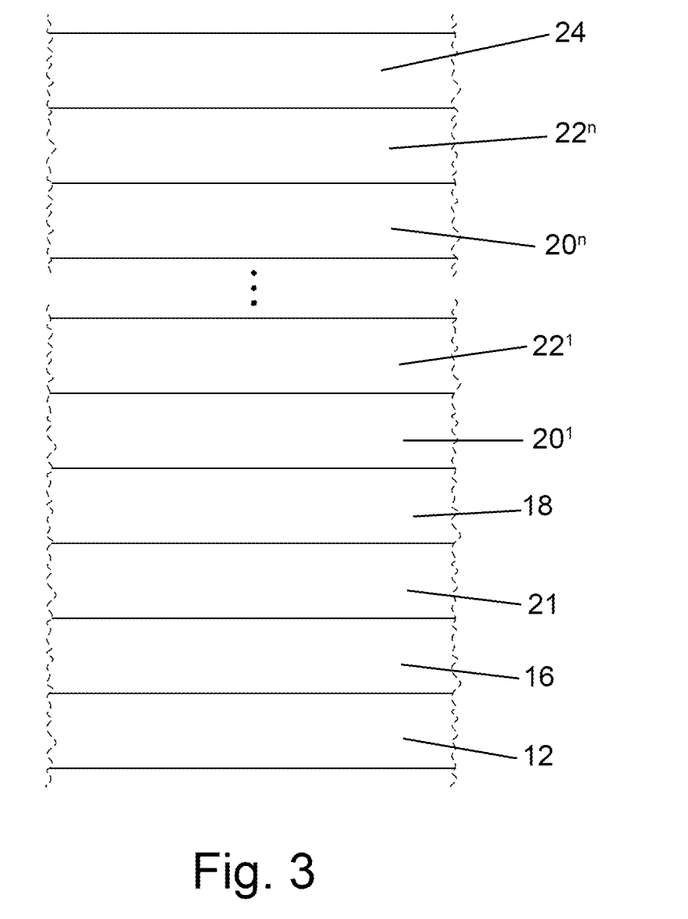
FIG. 3 is a schematic partial cross-sectional view of an embodiment of the invention.

An embodiment of the invention of the invention is illustrated schematically in FIG. 3. In FIG. 3, the anode, 12, has a dielectric, 16, thereon wherein the dielectric forms on the interstitial surfaces of the anode. A first mordant layer, 21, is on the dielectric and preferably the mordant layer extends into the interstitial surfaces of the anode to form a coating on the dielectric. A primary conductive polymer layer, 18, forms a coating on the first mordant layer, 21. In an embodiment, coated on the primary conductive polymer layer are alternating layers of mordant, 20¹-20ⁿ, and secondary conductive polymer layers, 22¹-22ⁿ with the number, n, of alternating layers of mordant and secondary conductive polymer layer being at least one, and preferably at least two, to no more than 20.

Figure 2:
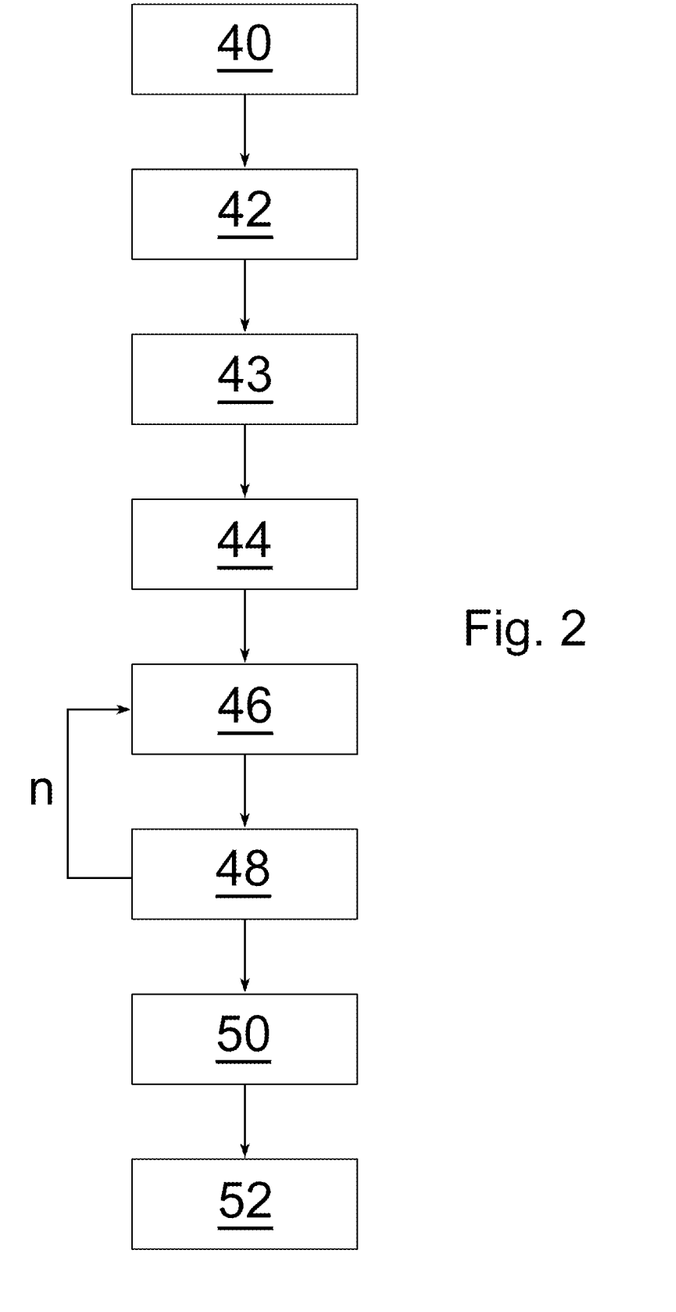
FIG. 2 is a flow-chart representation of an embodiment of the invention.

The process for forming the electrolytic capacitor will be described with reference to FIG. 2. In FIG. 2 the process for forming an electrolytic capacitor is represented in a flow chart. An anode is prepared at 40. The anode can be a foil or the anode can be prepared by pressing a powder. A pressed powder anode preferably comprises an anode wire extending therefrom. The anode is preferably sintered, particularly if a powder of niobium or tantalum is used as the anode powder. A dielectric is formed on the anode at 42. The method of forming the dielectric is not limiting with typical methods known to those of skill in the art suitable for demonstration of the invention. A mordant layer is formed on the dielectric at 43. A primary conductive polymer layer is formed on the mordant layer at 44. The primary conductive polymer layer is formed by in-situ polymerization or by the application of a pre-formed conductive polymer from a polymer solution or slurry. In-situ polymerization is well known to those of skill in the art to include polymerization of a monomer in the presence of the surface upon which the polymer is formed. In this instance the surface is the dielectric. The pre-formed conductive polymer suitable for use in forming the primary layer has a particle size of less than 20 nm and preferably below 1 nm, which is considered non-detectable, at which point the pre-formed conductive polymer is referred to as a soluble polymer. The primary conductive polymer layer is typically formed by multiple applications of the in-situ formed layer or conductive polymer solution or slurry. A mordant layer is formed on the primary conductive polymer layer at 46. The first mordant layer and second mordant layer are formed by applying a solution independently comprising a mordant compound, defined by Formula A, and a crosslinker, followed by drying. The first mordant layer and optional second mordant layer may comprise the same compound defined by Formula A or they may be different. The solvent for the first mordant layer application is not particularly limiting with water being exemplary for demonstration of the invention. The second mordant layer may be formed from a single application of solution or sequential applications. A secondary conductive polymer layer is formed on the mordant layer at 48. The secondary conductive polymer layer is preferably formed by applying a slurry comprising a conductive polymer wherein the conductive polymer has an average particle size of at least 50 nm to no more than 200 nm. The secondary conductive polymer layer is preferable formed from multiple applications of slurry. The sequential formation of the second mordant layer and secondary conductive polymer layer is repeated n times until the desired number of alternating layers is achieved. An adhesive layer is preferably formed on the terminal secondary conductive polymer layer at 50 wherein the adhesive layer preferable comprises at least one carbon containing layer and at least one metal containing layer as known in the art. The capacitor is finished at 52 wherein finishing typically includes the attachment of cathode external terminations, anode external terminations and resin encapsulation. Testing and any electrical or physical treatment may also be included as part of the finishing step.

Each secondary conductive polymer layer may comprise multiple sublayers with a primer layer therebetween. Primer layers are known in the art to comprise a crosslinker or a weak ionic acid between adjacent conductive polymer sublayers to improve inter-layer adhesion. Primer layers suitable for demonstration of the invention are taught in U.S. Pat. Nos. 8,882,856; 9,761,347; 9,761,378; 10,109,428 and 10,643,796 each of which is incorporated herein by reference. Particularly preferable primers are amine salts selected from an amine and a weak acid.

A particularly preferred anode material is a metal and a particularly preferred metal is a valve metal or a conductive oxide of a valve metal. Particularly preferred anodes comprise a material selected from the group consisting of niobium, aluminum, tantalum and NbO. Tantalum is the most preferred anode material. While not limited thereto, the advantages of the invention are most easily appreciated with high charge density powders such as above 50,000 CV/g. Below about 50,000 CV/g the issues related to power cycling are not as prevalent and therefore the advantages offered by the invention are not as readily realized. As the powder charge density increases the advantages of the invention are more readily apparent. Particularly preferred powders have a charge density above 100,000 CV/g, preferably above 200,000 CV/g and even more preferably above about 250,000 CV/g up to about 350,000 CV/g.

The anode wire is either embedded in or attached to the anode with a preference for an embedded anode wire. The material of construction for the anode wire is not particularly limited, however, it is preferable that the anode wire be the same material as the anode for manufacturing conveniences.

The dielectric, and method of forming the dielectric is not particularly limited herein. A particularly preferred dielectric is an oxide of the anode due to manufacturing considerations.

The primary conductive layer comprises a conductive polymer. The primary conductive layer is formed by in-situ polymerization of a monomer or the primary conductive layer is formed as a coating of pre-polymerized conductive polymer comprising a small average particle size, below about 20 nm, and more preferably, a soluble conductive polymer.

An in-situ formed conductive polymer is hypothesized to more effectively enter the interstitial portions of the porous anodized anode thereby forming an improved capacitor.

A soluble conductive polymer is a conductive polymer that completely dissolves in a solvent or solvent mixture without detectable particles with below about 1 nm being considered below typical particle size detection limits.

The solvent for the soluble conductive polymer can be water, organic solvents, or mixtures of water with miscible solvents such as alcohol and non-hydroxy polar solvents such as dimethyl sulfoxide (DMSO), dimethylformamide (DMF), dimethylacetamide (DMAc), etc.

A soluble conductive polymer is believed to impregnate the pores of anodes as effectively as conductive polymers formed by in-situ methods and better than conductive polymer dispersion with detectable particles. Neither in-situ conductive polymer nor soluble conductive polymer contains polyanion dopants such as polystyrene sulfonic acid. In many cases, soluble conductive polymers contain self-doping functionalities.

The mordant layer comprises a mordant compound of Formula A and a crosslinker wherein Formula A is defined by;

Formula A wherein:
$R_1$ and $R_2$ is independently selected from H; cation, linear alkyl, cyclic alkyl or substituted alkyl of 1 to 10 carbons;
$R_3$ is selected from —$CR_4R_5R_6$ wherein $R_4$ represents a hydrogen, an alkyl of 1-20 carbons or an aryl of 6-20 carbons; $R_4$ and $R_5$ can be taken together to represent a cyclic alkyl or substituted cyclic alkyl or (—$CR_6OP(O)OR_1OR_2)_n$;
$R_5$ represents an alkyl of 1-20 carbons or an aryl of 6-20 carbons; $R_4$ and $R_5$ can be taken together to represent a cyclic alkyl or substituted cyclic alkyl or (—$CR_6OP(O)OR_1OR_2)_n$;
$R_6$ represents a hydrogen, an alkyl of 1-20 carbons or an aryl of 6-20 carbons;
n is an integer from 1 to 20.

A preferred embodiment of the mordant compound is represented by:

wherein:
each of $R^{13}$-$R^{18}$ is independently selected from H; —PO(OH)$_2$ and —POOR$^{19}$;
each of $R^7$-$R^{12}$ is independently a H or each of $R^7$-$R^{12}$ may be taken with one adjacent group to represent an alkene; and each $R^{19}$ is independently H, alkyl or substituted alkyl of 1 to 10 carbons;

with the proviso that at least one of $R^{13}$-$R^{18}$ is —PO(OH)$_2$.

Examples of the mordant compound of Formula A includes orthophosphoric acid, pyrophosphoric acid, polyphosphoric acid, tri or tetrapolyphosphoric acid, vinylphosphoric acid, polyvinylphosporic acid, allylphosphonic acid monoammonium salt, 11-phosphonoundecyl acrylate, Phosphoric acid 2-hydroxyethyl methacrylate ester, phytic acid, phytic acid sodium salt, inositol phosphate, ethyl dihydrogen phosphate, diethyl hydrogen phosphate, triethyl phosphate, trimetaphosphoric acid, adenosine monophosphate, diphosphate or triphosphate, organophosphate, and so forth.

The crosslinker comprises one or more functional groups selected from carboxylic, hydroxyl, amine, epoxy, anhydride, isocyanate, imide, amide, carboxyl, carboxylic anhydride, silane, oxazoline, (meth)acrylates, vinyls, maleates, maleimides, itaconates, allyl alcohol esters, dicyclo-pentadiene-based unsaturations, unsaturated $C_{12}$-$C_{22}$ fatty esters or amides, carboxylic acid salts, quaternary ammonium salts, polyester, polyurethane, polyamide, polyamine, polyimide, silicone polyester, hydroxyl functional silicone, hydroxyethyl cellulose, polyvinyl alcohol, phenolic, epoxy, butyral, copolymers of these or mixture of these multifunctional polymers such as epoxy/amine, epoxy/anhydride, isocyanate/amine, isocyanate/alcohol, unsaturated polyesters, vinyl esters, unsaturated polyester and vinyl ester blends, unsaturated polyester/urethane hybrid resins, polyurethane-ureas, reactive dicyclopentadiene resins or reactive polyamides. The oligomer or polymer with multifunctional or multiple reactive groups preferably includes at least one carboxylic acid group and at least one hydroxyl function group. A particularly preferred oligomer or polymer with multifunctional reactive groups is a polyester containing carboxylic and hydroxyl functionality. In addition to oligomers or polymers, inorganic particles with surface functional groups.

Crosslinkers include organometallic compounds, epoxy compounds, inorganic oxides etc. Particularly preferred crosslinkers comprise melamines, isocyanates, epoxies, hexamethoxymelamines, glyoxals, furfural aldehydes, melamine formaldehyde condensates, divinyl sulfones and epoxy compounds.

Particularly preferred organometallic compounds selected from organofunctional silane, titanate and so forth.

Organofunctional silanes and organic compounds with more than one crosslinking group, especially more than one epoxy group, are particularly suitable for use as crosslinkers for the instant invention especially when used in combination.

An exemplary organofunctional silane is defined by the formula:

$$XR_1Si(R_3)_{3-n}(R_2)_n$$

wherein X is an organic functional group such as amino, epoxy, anhydride, hydroxy, mercapto, sulfonate, carboxylate, phosphonate, halogen, vinyl, methacryloxy, ester, alkyl, etc; $R_1$ is an aryl or alkyl $(CH_2)_m$ wherein m can be 0 to 14; $R_2$ is individually a hydrolysable functional group such as alkoxy, acyloxy, halogen, amine or their hydrolyzed product; $R_3$ is individually an alkyl functional group of 1-6 carbons; n is 1 to 3.

The organofunctional silane can also be dipodal, define by the formula:

$$Y(Si(R_3)_{3-n}(R_2)_n)_2$$

wherein Y is any organic moiety that contains reactive or nonreactive functional groups, such as alkyl, aryl, sulfide or melamine; $R_3$, $R_2$ and n are defined above. The organofunctional silane can also be multi-functional or polymeric silanes, such as silane modified polybutadiene, or silane modified polyamine, etc.

Examples of organofunctional silane include 3-glycidoxypropyltrimethoxysilane, 3-aminopropyltriethoxysilane, aminopropylsilanetriol, (triethoxysilyl)propylsuccinic anhydride, 3-mercaptopropyltrimethoxysilane, vinyltrimethoxysilane, 3-methacryloxypropyltrimethoxysilane, 3-trihydroxysilyl-1-propane sulfonic acid, octyltriethyoxysilane, bis(triethoxysilyl)octane, etc. The examples are used to illustrate the invention and should not be regarded as conclusive Examples of organofunctional silane include 3-glycidoxypropyltrimethoxysilane, 3-aminopropytriethoxysilane, aminopropylsilanetriol, (triethoxysilyl)propylsuccinic anhydride, 3-mercaptopropyltrimethoxysilane, vinyltrimethoxysilane, 3-methacryloxypropyltrimethoxysilane, 3-trihydroxysilyl-1-propane sulfonic acid, octyltriethyoxysilane, bis(triethoxysilyl)octane, etc. The examples are used to illustrate the invention and should not be regarded as conclusive.

A particularly preferred organofunctional silane is glycidyl silane defined by the formula:

wherein $R_1$ is an alkyl of 1 to 14 carbons and more preferably selected from methyl ethyl and propyl; and each $R_2$ is independently an alkyl or substituted alkyl of 1 to 6 carbons.

A particularly preferred glycidyl silane is 3-glycidoxypropyltrimethoxysilane defined by the formula:

which is referred to herein as "Silane A" for convenience.

A particularly suitable organometallic is neoalkoxy titanate with titanium IV 2,2(bis 2-propenolatomethyl)butanolato, tris neodecanoato-O; titanium IV 2,2(bis 2-propenolatomethyl)butanolato, iris(dodecyl)benzenesulfonato-O; titanium IV 2,2(bis 2-propenolatomethyl)butanolato, tris(dioctyl)phosphato-O; titanium IV 2,2(bis 2-propenolatomethyl)tris(dioctyl)pyrophosphatobutanolato-O; titanium IV 2,2(bis 2-propenolatomethyl)butanolato, tris(2-ethylenediamino)ethylato; and titanium IV 2,2(bis 2-propenolatomethyl)butanolato, tris(3-amino)phenylato being representative neoalkoxy titanates and derivatives thereof.

A crosslinker with at least two epoxy groups is referred to herein as an epoxy crosslinking compound and is defined by the formula:

wherein the X is an alkyl or substituted alkyl of 0-14 carbons, preferably 0-6 carbons; an aryl or substituted aryl, an ethylene ether or substituted ethylene ether, polyethylene ether or substituted polyethylene ether with 2-20 ethylene ether groups or combinations thereof. A particularly preferred substitute is an epoxy group.

Examples of epoxy crosslinking compounds having more than one epoxy groups include ethylene glycol diglycidyl ether (EGDGE), propylene glycol diglycidyl ether (PGDGE), 1,4-butanediol diglycidyl ether (BDDGE), pentylene glycol diglycidyl ether, hexylene glycol diglycidyl ether, cyclohexane dimethanol diglycidyl ether, resorcinol glycidyl ether, glycerol diglycidyl ether (GDGE), glycerol polyglycidyl ethers, diglycerol polyglycidyl ethers, trimethylolpropane polyglycidyl ethers, sorbitol diglycidyl ether (Sorbitol-DOE), sorbitol polyglycidyl ethers, polyethylene glycol diglycidyl ether (PEGDGE), polypropylene glycol diglycidyl ether, polytetramethylene glycol diglycidyl ether, di(2,3-epoxypropyl)ether, 1,3-butadiene diepoxide, 1,5-hexadiene diepoxide, 1,2,7,8-diepoxyoctane, 1,2,5,6-diepoxycyclooctane, cyclohexene diepoxide, bisphenol A diglycidyl ether, maleimide-epoxy compounds, etc.

A preferred epoxy crosslinking compound is glycidyl ether, defined by the formula:

wherein $R_3$ is an alkyl or substituted alkyl of 1-14 carbons, preferably 2-6 carbons; an ethylene ether or polyethylene ether with 2-20 ethylene ether groups; an alkyl substituted with a group selected from hydroxy, or or —$(CH_2OH)_xCH_2OH$ wherein X is 1 to 14.

Particularly preferred glycidyl ethers are represented by:

EGDGE: ethylene glycol diglycidyl ether where n is an integer of 1 to 220;
PEGDGE: polyethylene glycol diglycidyl ether BDDGE: 1,4-butanediol diglycidyl ether R = (1:2) H or *

GDGE: glycerol diglycidyl ether

Sorbitol-DGE: sorbitol diglycidyl ether.

Mixtures of the crosslinkers may be used.

The secondary conductive polymer layers are formed from a slurry comprising a prepolymerized polymer of polythiophene and optionally a dopant such as a styrene sulfonic acid or polymer comprising styrene sulfonic acid groups. The preferred polymerization method uses a stator screen which provides a uniform droplet size resulting in average polymer particle sizes of at least about 50 nm to no more than about 200 nm, more preferably 150 nm and even more preferably below about 100 nm.

The preferred polythiophene monomer for polymerization is shown as polymerized in Formula B:

Formula B wherein:
$R^{14}$ and $R5^2$ independently represent linear or branched $C_1$-$C_{16}$ alkyl, $C_2$-$C_{18}$ alkoxyalkyl $C_3$-$C_8$ cycloalkyl, phenyl or benzyl which are unsubstituted or substituted by $C_1$-$C_6$ alkyl, $C_1$-$C_6$ alkoxy, halogen or $OR^{17}$; or
$R^{14}$ and $R^{15}$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^{17}$ represents hydrogen, linear or branched $C_1$-$C_{16}$ alkyl or $C_2$-$C_{18}$ alkoxyalkyl, $C_3$-$C_8$ cycloalkyl, phenyl or benzyl which are unsubstituted or substituted by $C_1$-$C_6$ alkyl;
X is S;
n represents that the compound of Formula B is a polymer with a range of molecular weights; in general n is an integer of 2 to a number sufficient to reach an average molecular weight of about 500,000.

$R^{14}$ and $R^{15}$ of Formula B are preferably chosen to prohibit polymerization at the β-site of the ring as it is most preferred that only α-site polymerization be allowed to proceed. It is more preferred that $R^{14}$ and $R^{15}$ are not hydrogen and more preferably, $R^{14}$ and $R^{15}$ are α-directors with ether linkages being preferable over alkyl linkages. It is most preferred that the $R^{14}$ and $R^{15}$ are small to avoid steric interferences.

In a particularly preferred embodiment $R^{14}$ and $R^{15}$ of Formula B are taken together to represent —O—(CHR$^{18}$)$_m$—O— wherein m is an integer from 1 to 5 and most preferably 2; each $R^4$ is independently selected from hydrogen, a linear or branched $C_1$ to $C_{18}$ alkyl radical $C_5$ to $C_{12}$ cycloalkyl radical, $C_6$ to $C_{14}$ aryl radical $C_7$ to $C_{18}$ aralkyl radical or $C_1$ to $C_4$ hydroxyalkyl radical, optionally substituted with a functional group selected from carboxylic acid, hydroxyl, amine, substituted amines, alkene, acrylate, thiol, alkyne, azide, sulfate, sulfonate, sulfonic acid, imide, amide, epoxy, anhydride, silane, and phosphate; hydroxyl radical; or $R^4$ is selected from —(CHR$^{19}$)$_a$—R$^{19}$; —O(CHR$^{19}$)$_a$R$^{20}$; —CH$_2$O(CHR$^{19}$)$_a$R$^{20}$; —CH$_2$O(CH$_2$CHR$^{19}$O)$_a$R$^{20}$, or $R^{18}$ is a functional group selected from the group consisting of hydroxyl, carboxyl, amine, epoxy, amide, imide, anhydride, hydroxymethyl, alkene, thiol, alkyne, azide, sulfonic acid, benzene sulfonic acidsulfate, SO$_3$M, anhydride, silane, acrylate and phosphate;

$R^{19}$ is H or alkyl chain of 1 to 5 carbons optionally substituted with functional groups selected from carboxylic acid, hydroxyl, amine, alkene, thiol, alkyne, azide, epoxy, acrylate and anhydride, $R^{20}$ is H, —SO$_3$M or an alkyl chain of 1 to 5 carbons optionally substituted with functional groups selected from carboxylic acid, hydroxyl, amine, substituted amines, alkene, thiol, alkyne, azide, amide, imide, sulfate, SO$_3$M, amide, epoxy, anhydride, silane, acrylate and phosphate. a is integer from 0 to 10. M is a H or cation preferably selected from ammonia, sodium or potassium.

A particularly preferred polymer is 3,4-polyethylene dioxythiophene (PEDOT) which is prepared from monomeric 3,4-ethylene dioxythiophene (EDOT).

Particularly preferred conductive polymers include poly(3,4-ethylenedioxythiophene), poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)methoxy)-1-propane-sulphonic acid, salt), poly(4-(2,3-dihydrothieno-[3,4-b][1,4]dioxin-2-yl)methoxy)-1-methyl-1-propane-sulphonic acid, salt), poly(4-(2,3-dihydrothieno-[3,4-b][1,4]dioxin-2-yl)methoxy alcohol, poly(N-methylpyrrole), poly(3-methylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), polythiophene, poly(3-methylthiophene), poly(3-hexylthiophene) poly(3-heptylthiophene), poly(3-octylthiophene), poly(3-decylthiophene), poly(3-dodecylthiophene), poly(3-octadecylthiophene), poly(3-bromothiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-ethylenedoxythiophene), poly(3,4-propylenedioxythiophene), poly(3,4-butenedioxythiophene) poly(3-carboxythiophene) poly(3-methyl-4-carboxythiophene), poly(3-ethyl-4-carboxyethylthiophene), poly(3-methyl-4-carboxybutylthiophene), polyaniline, poly(2-methylaniline), poly(3-isobutylaniline), poly(2-aniline sulfonate), poly(3-aniline sulfonate), and the like.

Particularly suitable polymers or co-polymers are selected from the group consisting of poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)methoxy)-1-methyl-1-propane-sulphonic acid, salt), poly(N-methylpyrrole), poly(3-methylthiophene), poly(3-methoxythiophene), and poly(3,4-ethylenedioxythiophene).

The insulating resin is not particularly limited herein with any non-electrically conducting compatible resin being suitable for demonstration of the invention. If the electrolytic capacitor is embedded or encased the resin optional.

Comparative Example 1

A series of tantalum anodes (330 microfarads, 16V rated voltage) were prepared. The tantalum was anodized to form a dielectric on the tantalum anode. The primary conductive polymer were formed by dipping the anode in the oxidizer Iron Tosylate followed by dipping in EDOT monomer drying and washing. This process was repeated a few times to build PEDOT film inside the anode pores. A conductive polymer dispersion containing epoxy and silane compounds was applied to form a secondary conductive polymer layer. After drying, alternating layers of an amine salt and the secondary conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR was measured on packaged parts.

Example 1

A series of solid electrolytic capacitors were prepared in similar manner to that in comparative example 1 except that a solution comprising phytic acid silane was applied between primary conductive polymer and secondary conductive polymer.

Example 2

A series of solid electrolytic capacitors were prepared in similar manner to that in Comparative Example 1 except that a solution comprising phytic acid and silane was applied between dielectric and primary conductive polymer and optionally washed with methanol or water.

Example 3

A series of solid electrolytic capacitors were prepared in similar manner to that in Comparative Example 1 except that a solution comprising phytic acid and silane was applied between dielectric and primary conductive polymer and over each layer of primary conductive polymer and optionally washed with methanol or water.

TABLE 1

|  | Anomalous Charging Current (ACC) (xTheoretical Value) |
| --- | --- |
| Comparative Example 1 | 17.12 |
| Example 1 | 10.04 |
| Example 2 | 5.44 |
| Example 3 | 1.5 |

Comparative Example 2

A series of solid electrolytic capacitors were prepared in similar manner to that in Comparative Example 1 except that 470 microfarads, 16V tantalum anodes were used.

Example 4

A series of solid electrolytic capacitors were prepared in similar manner to that in Comparative Example 2 except that a solution comprising phytic acid and silane was applied over each layer of primary conductive polymer and optionally washed with methanol or water.

Example 5

A series of solid electrolytic capacitors were prepared in similar manner to that in Comparative Example 2 except that a solution comprising phytic acid and silane was applied between dielectric and primary conductive polymer and over each layer of primary conductive polymer and optionally washed with methanol or water.

TABLE 2

| | Anomalous Charging Current (ACC) (xTheoretical Value) |
|---|---|
| Comparative Example 2 | 33.0 |
| Example 4 | 7.65 |
| Example 5 | 2.31 |

As shown in Table 1 and Table 2, examples containing mordant layer shows reduced anomalous charging current.

TABLE 3

| | 105° C. Life test at rated voltage | | |
|---|---|---|---|
| | Time (h) | ESR % change | Leakage Current (uA) |
| Comparative Example 1 | 0 | 0 | 53.29 |
| | 500 | 5.36 | 226.2 |
| | 1,000 | 9.22 | 258.5 |
| Example 3 | 0 | 0 | 8.76 |
| | 500 | 2.77 | 5.37 |
| | 1,000 | 4.50 | 4.43 |

TABLE 4

| | 60° C./90% RH load humidity test | | |
|---|---|---|---|
| | Time (h) | ESR % change | Leakage Current (uA) |
| Comparative Example 1 | 0 | 0 | 44.6 |
| | 500 | 8.38 | 5.66 |
| | 1,000 | 15.10 | 26.06 |

TABLE 4-continued

| | 60° C./90% RH load humidity test | | |
|---|---|---|---|
| | Time (h) | ESR % change | Leakage Current (uA) |
| Example 3 | 0 | 0 | 6.72 |
| | 500 | 0.34 | 6.6 |
| | 1,000 | 1.76 | 24.43 |

As shown in Table 3 and Table 4, examples containing mordant layer shows improved ESR and leakage reliability in high temperature and high humidity conditions at rated voltage which is 55% of formation voltage.

The invention has been described with reference to preferred embodiments without limit thereto. One of skill in the art would realize additional embodiments which are described and set forth in the claims appended hereto.

The invention claimed is:

1. An electrolytic capacitor comprising:
   an anode comprising a dielectric layer on said anode;
   a first mordant layer on said dielectric wherein said first mordant layer comprises a mordant compound of Formula A:

Formula A wherein:
   $R_1$ and $R_2$ is independently selected from H; cation, linear alkyl, cyclic alkyl or substituted alkyl of 1 to 10 carbons;
   $R_3$ is selected from $-CR_4R_5R_6$ wherein $R_4$ represents a hydrogen, an alkyl of 1-20 carbons or an aryl of 6-20 carbons; $R_4$ and $R_5$ can be taken together to represent a cyclic alkyl or substituted cyclic alkyl or $(-CR_6OP(O)OR_1OR_2)_n$;
   $R_5$ represents an alkyl of 1-20 carbons or an aryl of 6-20 carbons; $R_4$ and $R_5$ can be taken together to represent a cyclic alkyl or substituted cyclic alkyl or $(-CR_6OP(O)OR_1OR_2)_n$;
   $R_6$ represents a hydrogen, an alkyl of 1-20 carbons or an aryl of 6-20 carbons; and
   n is an integer from 1 to 20; and
   a crosslinker; and
   a primary conductive polymer layer on said first mordant layer.

2. The electrolytic capacitor of claim 1 wherein said mordant compound is defined by wherein:
each of $R^7$-$R^{12}$ is independently a H or each of $R^7$-$R^{12}$ may be taken with one adjacent group to represent an alkene;
each of $R^{13}$-$R^{18}$ is independently selected from H; —PO(OH)$_2$ or —POOR$^{19}$; and
each $R^{19}$ is independently H, alkyl or substituted alkyl of 1 to 10 carbons;
with the proviso that at least one of $R^{13}$-$R^{18}$ is —PO(OH)$_2$.

3. The electrolytic capacitor of claim 1 wherein said mordant compound is selected from orthophosphoric acid, pyrophosphoric acid, polyphosphoric acid, tri or tetrapolyphosphoric acid, vinylphosphoric acid, polyvinylphosporic acid, allylphosphonic acid monoammonium salt, 11-phosphonoundecyl acrylate, Phosphoric acid 2-hydroxyethyl methacrylate ester, phytic acid and phytic acid sodium salt.

4. The electrolytic capacitor of claim 3 wherein said mordant compound is orthophosphoric acid.

5. The electrolytic capacitor of claim 3 wherein said mordant compound is phytic acid.

6. The electrolytic capacitor of claim 1 wherein said mordant compound is mixture of phytic acid and orthophosphoric acid.

7. The electrolytic capacitor of claim 1 wherein said anode comprises a valve metal.

8. The electrolytic capacitor of claim 7 wherein said valve metal is selected from the group consisting of aluminum, tantalum and niobium.

9. The electrolytic capacitor of claim 1 wherein said anode comprises a powder having a charge density of at least 50,000 CV/g.

10. The electrolytic capacitor of claim 9 wherein said anode comprises a powder having a charge density of at least 100,000 CV/g.

11. The electrolytic capacitor of claim 10 wherein said anode comprises a powder having a charge density of at least 200,000 CV/g.

12. The electrolytic capacitor of claim 1 having anomalous charging current below 10× theoretical value.

13. The electrolytic capacitor of claim 12 having anomalous charging current below 5× theoretical value.

14. The electrolytic capacitor of claim 13 having anomalous charging current below 2× theoretical value.

15. The electrolytic capacitor of claim 1 having a leakage current below 50 microamps measured at rated voltage for 300 seconds.

16. The electrolytic capacitor of claim 1 having leakage current below 10 microamps measured at rated voltage for 300 seconds.

17. The electrolytic capacitor of claim 1 having leakage current below 200 microamps after being subjected to 105° C. life test at rated voltage for 500 hours and measured at rated voltage for 300 seconds.

18. The electrolytic capacitor of claim 1 having leakage current below 50 microamps after being subjected to 105° C. test at rated voltage for 500 hours and measured at rated voltage for 300 seconds.

19. The electrolytic capacitor of claim 1 having ESR shift below 15% after being subjected to 60° C./90% RH load humidity for 1000 hours.

20. The electrolytic capacitor of claim 1 wherein said primary conductive polymer layer comprises a polymer selected from the group consisting of a polymer layer formed by in-situ polymerization and a polymer layer formed from a pre-polymerized polymer have a particle size of less than 20 nm.

21. The electrolytic capacitor of claim 20 wherein said pre-polymerized polymer has a particle size of less than 1 nm.

22. The electrolytic capacitor of claim 20 wherein said pre-polymerized polymer is a soluble polymer.

23. The electrolytic capacitor of claim 1 wherein said crosslinker has a functionality selected from the group consisting of carboxylic, hydroxyl, amine, epoxy, anhydride, isocyanate, imide, amide, carboxyl, carboxylic anhydride, silane, oxazoline, (meth)acrylate, vinyl, maleate, maleimide, itaconate, allyl alcohol ester, dicyclo-pentadiene-based unsaturation, unsaturated $C_{12}$-$C_{22}$ fatty ester, unsaturated $C_{12}$-$C_{22}$ fatty amides, carboxylic acid salt, quaternary ammonium salt, polyester, polyurethane, polyamide, polyamine, polyimide, silicone polyester, hydroxyl functional silicone, hydroxyethyl cellulose, polyvinyl alcohol, phenolic, epoxy, butyral and mixtures thereof.

24. The electrolytic capacitor of claim 23 wherein said crosslinker comprises at least one amine group.

25. The electrolytic capacitor of claim 23 wherein said crosslinker comprises at least one group selected from melamine, isocyanate, epoxy, hexamethoxymelamine, glyoxal, furfural aldehyde, melamine formaldehyde condensate, divinyl sulfone and epoxy compounds.

26. The electrolytic capacitor of claim 23 wherein said crosslinker is defined by the formula:

wherein X is an alkyl or substituted alkyl of 0-14 carbons an aryl or substituted aryl, an ethylene ether or substituted ethylene ether, polyethylene ether or substituted polyethylene ether with 2-20 ethylene ether groups or combinations thereof.

27. The electrolytic capacitor of claim 23 wherein said crosslinker is selected from the group consisting of ethylene glycol diglycidyl ether, propylene glycol diglycidyl ether, 1,4-butanediol diglycidyl ether, pentylene glycol diglycidyl ether, hexylene glycol diglycidyl ether, cyclohexane dimethanol diglycidyl ether, resorcinol glycidyl ether, glycerol diglycidyl ether, glycerol polyglycidyl ethers, diglycerol polyglycidyl ethers, trimethylolpropane polyglycidyl ethers, sorbitol diglycidyl ether, sorbitol polyglycidyl ethers, polyethylene, glycol diglycidyl ether, polypropylene glycol diglycidyl ether, polytetramethylene glycol diglycidyl ether, di(2,3-epoxypropyl)ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether and maleimide-epoxy compounds.

28. The electrolytic capacitor of claim 23 wherein said crosslinker defined by the formula:

wherein $R_3$ is an alkyl or substituted alkyl of 1-14 carbons, an ethylene ether or polyethylene ether with 2-20 ethylene ether groups, an alkyl substituted with a group selected from hydroxy, —(CH$_2$OH)$_x$CH$_2$OH wherein X is 1 to 14.

29. The electrolytic capacitor of claim 23 wherein said crosslinker is selected from the group consisting of:

where n is an integer of 1 to 220;

30. The electrolytic capacitor of claim 1 wherein said crosslinker is an organometallic compound.

31. The electrolytic capacitor of claim 30 wherein said organometallic compound is an organofunctional silane defined by the formula:

wherein X is an organic functional group selected from the group consisting of amino, epoxy, anhydride, hydroxy, mercapto, sulfonate, carboxylate, phosphonate, halogen, vinyl, methacryloxy, ester and alkyl;

R$_1$ is an aryl or alkyl (CH$_2$)$_m$ wherein m is 0 to 14;

R$_2$ is individually a hydrolysable functional group selected from the group consisting of alkoxy, acyloxy, halogen, amine or their hydrolyzed product;

R$_3$ is individually an alkyl functional group of 1-6 carbons; and n is 1 to 3.

32. The electrolytic capacitor of claim 30 wherein said organometallic compound is defined by the formula:

wherein Y is an organic moiety comprising reactive or nonreactive functional groups;

R$_2$ is individually a hydrolysable functional group selected from the group consisting of alkoxy, acyloxy, halogen, amine and their hydrolyzed product;

R$_3$ is individually an alkyl functional group of 1-6 carbons; and n is 1 to 3.

33. The electrolytic capacitor of claim 30 wherein said organometallic compound is selected from the group consisting of 3-glycidoxypropyltrimethoxysilane, 3-aminopropytriethoxysilane, aminopropylsilanetriol, (triethoxysilyl)propylsuccinic anhydride, 3-mercaptopropyltrimethoxysilane, vinyltrimethoxysilane, 3-methacryloxypropyltrimethoxysilane, 3-trihydroxysilyl-1-propane sulfonic acid, octyltriethyoxysilane and bis(triethoxysilyl)octane.

34. The electrolytic capacitor of claim 30 wherein said organometallic compound is defined by the formula:

wherein R$_1$ is an alkyl of 1 to 14 carbons and more preferably selected from methyl ethyl and propyl; and each R$_2$ is independently an alkyl or substituted alkyl of 1 to 6 carbons.

35. The electrolytic capacitor of claim 1 further comprising a second mordant layer wherein said second mordant layer is between adjacent conductive polymer layers or incorporated in a secondary conductive polymer layer.

36. The electrolytic capacitor of claim 35 wherein said second mordant layer independently comprises mordant compound of said Formula A.

37. The electrolytic capacitor of claim 35 wherein said second mordant layer further comprises a second said crosslinker.

38. The electrolytic capacitor of claim 1 wherein said primary conductive polymer layer comprises a polymer defined by Formula B:

Formula B wherein:

R$^{14}$ and R$^{15}$ independently represent linear or branched C$_1$-C$_{16}$ alkyl or C$_2$-C$_{18}$ alkoxyalkyl; C$_3$-C$_8$ cycloalkyl, phenyl or benzyl which are unsubstituted or substituted by C$_1$-C$_6$ alkyl, C$_1$-C$_6$ alkoxy, halogen or OR$^{17}$; or R$^{14}$ and R$^{15}$, taken together, are a linear C$_1$-C$_6$ alkylene which is unsubstituted or substituted by C$_1$-C$_6$ alkyl, C$_1$-C$_6$alkoxy, halogen, C$_3$-C$_8$cycloalkyl, phenyl, benzyl, C$_1$-C$_4$ alkylphenyl, C$_1$-C$_4$ alkoxyphenyl, halophenyl, C$_1$-C$_4$ alkylbenzyl, C$_1$-C$_4$ alkoxybenzyl, halobenzyl or a 5-, 6-, or 7-membered heterocyclic structure containing two oxygen elements;

R$^{17}$ represents hydrogen, linear or branched C$_1$-C$_{16}$ alkyl, C$_2$-C$_{18}$ alkoxyalkyl, C$_3$-C$_8$ cycloalkyl, phenyl or benzyl which are unsubstituted or substituted by C$_1$-C$_6$ alkyl;

X is S; and n is an integer of 2 to a number sufficient to reach a molecular weight of about 500,000.

39. The electrolytic capacitor of claim 38 wherein $R^{14}$ and $R^{15}$ are taken together to represent —O—$(CHR^{18})_m$—O— wherein:
  m is an integer from 1 to 5;
  $R^{18}$ is independently selected from hydrogen; a linear or branched $C_1$ to $C_{18}$ alkyl radical, $C_5$ to $C_{12}$ cycloalkyl radical, $C_6$ to $C_{14}$ aryl radical, $C_7$ to $C_{18}$ aralkyl radical or $C_1$ to $C_4$ hydroxyalkyl radical, unsubstituted or substituted with a functional group selected from carboxylic acid, hydroxyl, amine, alkene, acrylate, thiol, alkyne, azide, sulfate, sulfonate, sulfonic acid, imide, amide, epoxy, anhydride, silane, phosphate, hydroxyl, —$(CHR^5)_a$—$R^{16}$; —$O(CHR^{19})_a R^{20}$; —$CH_2O(CHR^{19})_a R^{20}$, or —$CH_2O(CH_2CHR^{19}O)_a R^{20}$, or
  $R^{18}$ is a functional group selected from the group consisting of hydroxyl, carboxyl, amine, epoxy, amide, imide, anhydride, hydroxymethyl, alkene, thiol, alkyne, azide, sulfonic acid, benzene sulfonic acidsulfate, $SO_3M$, anhydride, silane, acrylate and phosphate;
  $R^{19}$ is H or an alkyl chain of 1 to 5 carbons which is unsubstituted or substituted with a functional group selected from the group consisting of carboxylic acid, hydroxyl, amine alkene, thiol, alkyne, azide, epoxy, acrylate and anhydride;
  $R^{20}$ is H, —$SO_3M$ or an alkyl chain of 1 to 5 carbons which is unsubstituted or substituted with a functional groups selected from the group consisting of carboxylic acid, hydroxyl, amine, alkene, thiol, alkyne, azide, amide, imide, sulfate, —$SO_3M$, amide, epoxy, anhydride, silane, acrylate and phosphate;
  a is integer from 0 to 10; and
  M is H or a cation selected the group consisting of from ammonia, sodium and potassium.

40. The electrolytic capacitor of claim 38 wherein said polymer is 3,4-polyethylene dioxythiophene.

41. The electrolytic capacitor of claim 38 wherein said polymer is selected from the group consisting of poly(3,4-ethylenedioxythiophene), poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)methoxy)-1-propane-sulphonic acid, salt), poly(4-(2,3-dihydrothieno-[3,4-b][1,4]dioxin-2-yl)methoxy)-1-methyl-1-propane-sulphonic acid, salt), poly(4-(2,3-dihydrothieno-[3,4-b][1,4]dioxin-2-yl)methoxy alcohol, poly(N-methylpyrrole), poly(3-methylpyrrole), poly(3-octylpyrrole), poly(3 decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3,4-dimethylthiophene), poly(3,4-dibutylthiophene), poly(3-hydroxythiophene), poly(3-ethoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-ethylenedioxythiophene), poly(3,4-propylenedioxythiophene), poly(3,4-butenedioxythiophene), poly(3-carboxythiophene), poly(3-methyl-4'-carboxythiophene), poly(3-methyl-4-carboxyethylthiophene), poly(3-methyl-4-carboxy-butylthiophene), polyaniline, poly(2-methylaniline), poly(3-isobutylaniline), poly(2-aniline sulfonate) and poly(3-aniline sulfonate).

42. The electrolytic capacitor of claim 38 wherein said polymer is selected from the group consisting of poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)methoxy)-1-methyl-1-propane-sulphonic acid, salt), poly(N-methylpyrrole), poly(3-methylthiophene), poly(3-methoxythiophene), and poly(3,4-ethylenedioxythiophene).

43. A method of forming an electrolytic capacitor comprising:
  forming an anode;
  forming a dielectric on said anode;
  forming a first mordant layer on said dielectric wherein said first mordant layer comprises a mordant compound of Formula A:

Formula A wherein:
  $R_1$ and $R_2$ is independently selected from H; cation, linear alkyl, cyclic alkyl or substituted alkyl of 1 to 10 carbons;
  $R_3$ is selected from —$CR_4R_5R_6$ wherein $R_4$ represents a hydrogen, an alkyl of 1-20 carbons or an aryl of 6-20 carbons; $R_4$ and $R_5$ can be taken together to represent a cyclic alkyl or substituted cyclic alkyl or (—$CR_6OP(O)OR_1OR_2)_n$;
  $R_5$ represents an alkyl of 1-20 carbons or an aryl of 6-20 carbons; $R_4$ and $R_5$ can be taken together to represent a cyclic alkyl or substituted cyclic alkyl or (—$CR_6OP(O)OR_1OR_2)_n$;
  $R_6$ represents a hydrogen, an alkyl of 1-20 carbons or an aryl of 6-20 carbons; and
  n is an integer from 1 to 20; and
  a crosslinker; and
  forming a primary conductive polymer layer on said first mordant layer.

44. The method of forming electrolytic capacitor electrolytic capacitor of claim 43 wherein said mordant compound is defined by wherein:
  each of $R^7$-$R^{12}$ is independently a H or each of $R^7$-$R^{12}$ may be taken with one adjacent group to represent an alkene;

each of $R^{13}$-$R^{18}$ is independently selected from H; —PO(OH)$_2$ and —POOR$^{19}$;

each $R^{19}$ is independently H, alkyl or substituted alkyl of 1 to 10 carbons;

with the proviso that at least one of $R^{13}$-$R^{18}$ is —PO(OH)$_2$.

45. The method of forming electrolytic capacitor of claim 43 wherein said mordant compound is selected from orthophosphoric acid, pyrophosphoric acid, polyphosphoric acid, tri or tetrapolyphosphoric acid, vinylphosphoric acid, polyvinylphosporic acid, allylphosphonic acid monoammonium salt, 11-phosphonoundecyl acrylate, Phosphoric acid 2-hydroxyethyl methacrylate ester, phytic acid, phytic acid sodium salt and so forth.

46. The method of forming electrolytic capacitor of claim 45 wherein said mordant compound is orthophosphoric acid.

47. The method of forming electrolytic capacitor of claim 45 wherein said mordant compound is phytic acid.

48. The method of forming electrolytic capacitor of claim 45 wherein said mordant compound is a mixture of phytic acid and orthophosphoric acid.

49. The method of forming an electrolytic capacitor of claim 45 wherein said anode comprises a valve metal.

50. The method of forming an electrolytic capacitor of claim 49 wherein said valve metal is selected from the group consisting of aluminum, tantalum and niobium.

51. The method of forming an electrolytic capacitor of claim 45 wherein said anode comprises a powder having a charge density of at least 50,000 CV/g.

52. The method of forming an electrolytic capacitor of claim 51 wherein said anode comprises a powder having a charge density of at least 100,000 CV/g.

53. The method of forming an electrolytic capacitor of claim 52 wherein said anode comprises a powder having a charge density of at least 200,000 CV/g.

54. The method of forming an electrolytic capacitor of claim 45 having anomalous charging current below 10× of theoretical value.

55. The method of forming an electrolytic capacitor of claim 54 having anomalous charging current below 5× theoretical value.

56. The method of forming an electrolytic capacitor of claim 55 having anomalous charging current below 2× theoretical value.

57. The method of forming an electrolytic capacitor of claim 45 having leakage current below 50 microamps measured at rated voltage for 300 seconds.

58. The method of forming an electrolytic capacitor of claim 57 having leakage current below 10 microamps measured at rated voltage for 300 seconds.

59. The method of forming an electrolytic capacitor of claim 45 having leakage current below 200 microamps after being subjected to 105° C. life test at rated voltage for 500 hours and measured at rated voltage for 300 seconds.

60. The method of forming an electrolytic capacitor of claim 59 having leakage current below 50 microamps after being subjected to 105° C. test at rated voltage for 500 hours and measured at rated voltage for 300 seconds.

61. The method of forming an electrolytic capacitor of claim 45 having ESR shift below 15% after being subjected to 60° C./90% RH load humidity for 1000 hours.

62. The method of forming an electrolytic capacitor of claim 45 wherein said forming said primary conductive polymer layer comprises in-situ polymerization.

63. The method of forming an electrolytic capacitor of claim 45 wherein said forming said primary conductive polymer layer comprises applying a pre-polymerized polymer having a particle size of less than 20 nm.

64. The method of forming an electrolytic capacitor of claim 63 wherein said pre-polymerized polymer has a particle size of less than 1 nm.

65. The method of forming an electrolytic capacitor of claim 63 wherein said pre-polymerized polymer is a soluble polymer.

66. The method of forming an electrolytic capacitor of claim 45 wherein said crosslinker has a crosslinkable functionality selected from the group consisting of carboxylic, hydroxyl, amine, epoxy, anhydride, isocyanate, imide, amide, carboxyl, carboxylic anhydride, silane, oxazoline, (meth)acrylate, vinyl, maleate, maleimide, itaconate, allyl alcohol ester, dicyclo-pentadiene-based unsaturation, unsaturated $C_{12}$-$C_{22}$ fatty ester, unsaturated $C_{12}$-$C_{22}$ fatty amides, carboxylic acid salt, quaternary ammonium salt, polyester, polyurethane, polyamide, polyamine, polyimide, silicone polyester, hydroxyl functional silicone, hydroxyethyl cellulose, polyvinyl alcohol, phenolic, epoxy, butyral and mixtures thereof.

67. The method of forming an electrolytic capacitor of claim 66 wherein said crosslinker comprises at least amine group.

68. The method of forming an electrolytic capacitor of claim 66 wherein said crosslinker comprises at least one group selected from melamine, isocyanate, epoxy, hexamethoxymelamine, glyoxal, furfural aldehyde, melamine formaldehyde condensate, divinyl sulfone and epoxy compounds.

69. The method of forming an electrolytic capacitor of claim 45 wherein said crosslinker is an organometallic compound.

70. The method of forming an electrolytic capacitor of claim 69 wherein said organometallic compound is an organofunctional silane defined by the formula:

wherein X is an organic functional group selected from the group consisting of amino, epoxy, anhydride, hydroxy, mercapto, sulfonate, carboxylate, phosphonate, halogen, vinyl, methacryloxy, ester and alkyl;

$R_1$ is an aryl or alkyl $(CH_2)_m$ wherein m is 0 to 14;

$R_2$ is individually a hydrolysable functional group selected from the group consisting of alkoxy, acyloxy, halogen, amine or their hydrolyzed product;

$R_3$ is individually an alkyl functional group of 1-6 carbons; and n is 1 to 3.

71. The method of forming an electrolytic capacitor of claim 69 wherein said organometallic compound is defined by the formula:

wherein Y is an organic moiety comprising reactive or nonreactive functional groups;

$R_2$ is individually a hydrolysable functional group selected from the group consisting of alkoxy, acyloxy, halogen, amine and their hydrolyzed product;

$R_3$ is individually an alkyl functional group of 1-6 carbons; and n is 1 to 3.

72. The method of forming an electrolytic capacitor of claim 69 wherein said organometallic compound is selected from the group consisting of 3-glycidoxypropyltrimethoxysilane, 3-aminopropyltriethoxysilane, aminopropylsilanetriol, (triethoxysilyl)propylsuccinic anhydride, 3-mercapto- propyltrimethoxysilane, vinyltrimethoxysilane, 3-methacryloxypropyltrimethoxysilane, 3-trihydroxysilyl-1-propane sulfonic add, octyltriethyoxysilane and bis(tri-ethoxysilyl)octane.

73. The method of forming an electrolytic capacitor of claim 69 wherein said organometallic compound is defined by the formula:

wherein $R_1$ is an alkyl of 1 to 14 carbons and more preferably selected from methyl ethyl and propyl; and each $R_2$ is independently an alkyl or substituted alkyl of 1 to 6 carbons.

74. The method of forming an electrolytic capacitor of claim 45 wherein said crosslinker is defined by the formula:

wherein X is an alkyl or substituted alkyl of 0-14 carbons an aryl or substituted aryl, an ethylene ether or substituted ethylene ether, polyethylene ether or substituted polyethylene ether with 2-20 ethylene ether groups or combinations thereof.

75. The method of forming an electrolytic capacitor of claim 45 wherein said crosslinker is selected from the group consisting of ethylene glycol diglycidyl ether, propylene glycol diglycidyl ether, 1,4-butanediol diglycidyl ether, pentylene glycol diglycidyl ether, hexylene glycol diglycidyl ether, cyclohexane dimethanol diglycidyl ether, resorcinol glycidyl ether, glycerol diglycidyl ether, glycerol polyglycidyl ethers, diglycerol polyglycidyl ethers, trimethylolpropane polyglycidyl ethers, sorbitol diglycidyl ether, sorbitol polyglycidyl ethers, polyethylene glycol diglycidyl ether, polypropylene glycol diglycidyl ether, polytetramethylene glycol diglycidyl ether, di(2,3-epoxypropyl)ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether and maleimide-epoxy compounds.

76. The method of forming an electrolytic capacitor of claim 45 wherein said crosslinker defined by the formula:

wherein $R_3$ is an alkyl or substituted alkyl of 1-14 carbons, an ethylene ether or polyethylene ether with 2-20 ethylene ether groups, an alkyl substituted with a group selected from hydroxy,

—$(CH_2OH)_xCH_2OH$ wherein X is 1 to 14.

77. The method of forming an electrolytic capacitor of claim 45 wherein said crosslinker is selected from the group consisting of:

where n is an integer of 1 to 220;

78. The method of forming an electrolytic capacitor of claim 45 wherein said mordant layer comprises mordant compound of formula A and crosslinker in ratio of at least 1:0.1 to no more than 0.1:1.

79. The method of forming an electrolytic capacitor of claim 45 wherein said mordant layer comprises said mordant compound and said crosslinker in a solution.

80. The method of forming an electrolytic capacitor of claim 79 wherein said mordant layer solution concentration is at least 1% to no more than 50%.

81. The method of forming an electrolytic capacitor of claim 45 further comprising forming a second mordant layer wherein said second mordant layer is between adjacent conductive polymer layers or incorporated in a conductive polymer layer.

82. The method of forming an electrolytic capacitor of claim 81 wherein said second mordant layer independently comprises said mordant compound of said Formula A.

83. The method of forming an electrolytic capacitor of claim 81 wherein said second mordant layer further comprises a second said crosslinker.

84. The method of forming an electrolytic capacitor of claim 45 wherein said primary conductive polymer layer comprises a polymer defined by Formula B:

Formula B wherein:

$R^{14}$ and $R^{15}$ independently represent linear or branched $C_1$-$C_{16}$ alkyl or $C_2$-$C_{18}$ alkoxyalkyl; $C_3$-$C_8$ cycloalkyl, phenyl or benzyl which are unsubstituted or substituted by $C_1$-$C_6$ alkyl, $C_1$-$C_6$ alkoxy, halogen or $OR^{17}$; or $R^{14}$ and $R^{15}$, taken together, are a linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl, halobenzyl or a 5-, 6-, or 7-membered heterocyclic structure containing two oxygen elements;

$R^{17}$ represents hydrogen, linear or branched $C_1$-$C_{16}$ alkyl, $C_2$-$C_{18}$ alkoxyalkyl, $C_3$-$C_8$ cycloalkyl, phenyl or benzyl which are unsubstituted or substituted by $C_1$-$C_6$ alkyl;

X is S; and n is an integer of 2 to a number sufficient to reach a molecular weight of about 500,000.

85. The method of forming an electrolytic capacitor of claim 84 wherein $R^{14}$ and $R^{15}$ are taken together to represent —O—$(CHR^{18})_m$—O— wherein:

m is an integer from 1 to 5;

$R^{18}$ is independently selected from hydrogen; a linear or branched $C_1$ to $C_{18}$ alkyl radical, $C_5$ to $C_{12}$ cycloalkyl radical, $C_6$ to $C_{14}$ aryl radical, $C_7$ to $C_{18}$ aralkyl radical or $C_1$ to $C_4$ hydroxyalkyl radical, unsubstituted or substituted with a functional group selected from carboxylic acid, hydroxyl, amine, alkene, acrylate, thiol, alkyne, azide, sulfate, sulfonate, sulfonic acid, imide, amide, epoxy, anhydride, silane, phosphate, hydroxyl, —$(CHR^5)_a$—$R^{16}$; —$O(CHR^{19})_aR^{20}$; —$CH_2O(CHR^{19})_aR^{20}$, or —$CH_2O(CH_2CHR^{19}O)_aR^{20}$, or $R^{18}$ is a functional group selected from the group consisting of hydroxyl, carboxyl, amine, epoxy, amide, imide, anhydride, hydroxymethyl, alkene, thiol, alkyne, azide, sulfonic acid, benzene sulfonic acidsulfate, $SO_3M$, anhydride, silane, acrylate and phosphate;

$R^{19}$ is H or an alkyl chain of 1 to 5 carbons which is unsubstituted or substituted with a functional group selected from the group consisting of carboxylic acid, hydroxyl, amine, alkene, thiol, alkyne, azide, epoxy, acrylate and anhydride;

$R^{20}$ is H, —$SO_3M$ or an alkyl chain of 1 to 5 carbons which is unsubstituted or substituted with a functional groups selected from the group consisting of carboxylic acid, hydroxyl, amine, alkene, thiol, alkyne, azide, amide, imide, sulfate, —$SO_3M$, amide, epoxy, anhydride, silane, acrylate and phosphate;

a is integer from 0 to 10; and

M is H or a cation selected the group consisting of from ammonia, sodium and potassium.

86. The method of forming an electrolytic capacitor of claim 84 wherein said polymer is 3,4-polyethylene dioxythiophene.

87. The method of forming an electrolytic capacitor of claim 84 wherein said polymer is selected from the group consisting of poly(3,4-ethylenedioxythiophene), poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)methoxy)-1-propane-sulphonic acid, salt), poly(4-(2,3-dihydrothieno-[3,4-b][1,4]dioxin-2-yl)methoxy)-1-methyl-1-propane-sulphonic acid, salt), poly(4-(2,3-dihydrothieno-[3,4-b][1,4]dioxin-2-yl)methoxy alcohol, poly(N-methylpyrrole), poly(3-ethylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole) poly(3-methyl-4-carboxybutylpyrrole), poly(3-hydroxypyrrole), poly(3-methoxypyrrole), polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-ethylenedoxythiophene), poly(3,4-propylenedioxythiophene), poly(3,4-butenedioxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-aniline sulfonate) and poly (3-aniline sulfonate).

88. The method of forming an electrolytic capacitor of claim 84 wherein said polymer is selected from the group consisting of poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)methoxy)-1-methyl-1-propane-sulphonic add, salt), poly(N-methylpyrrole), poly (3-methylthiophen) poly(3-methoxythiophene) and poly(3,4-ethylenedioxythiophene).

* * * * *